Sept. 29, 1925.
G. C. LOONEY
1,555,681
LOCOMOTIVE HEADLIGHT MOVING MEANS
Filed Aug. 20, 1924
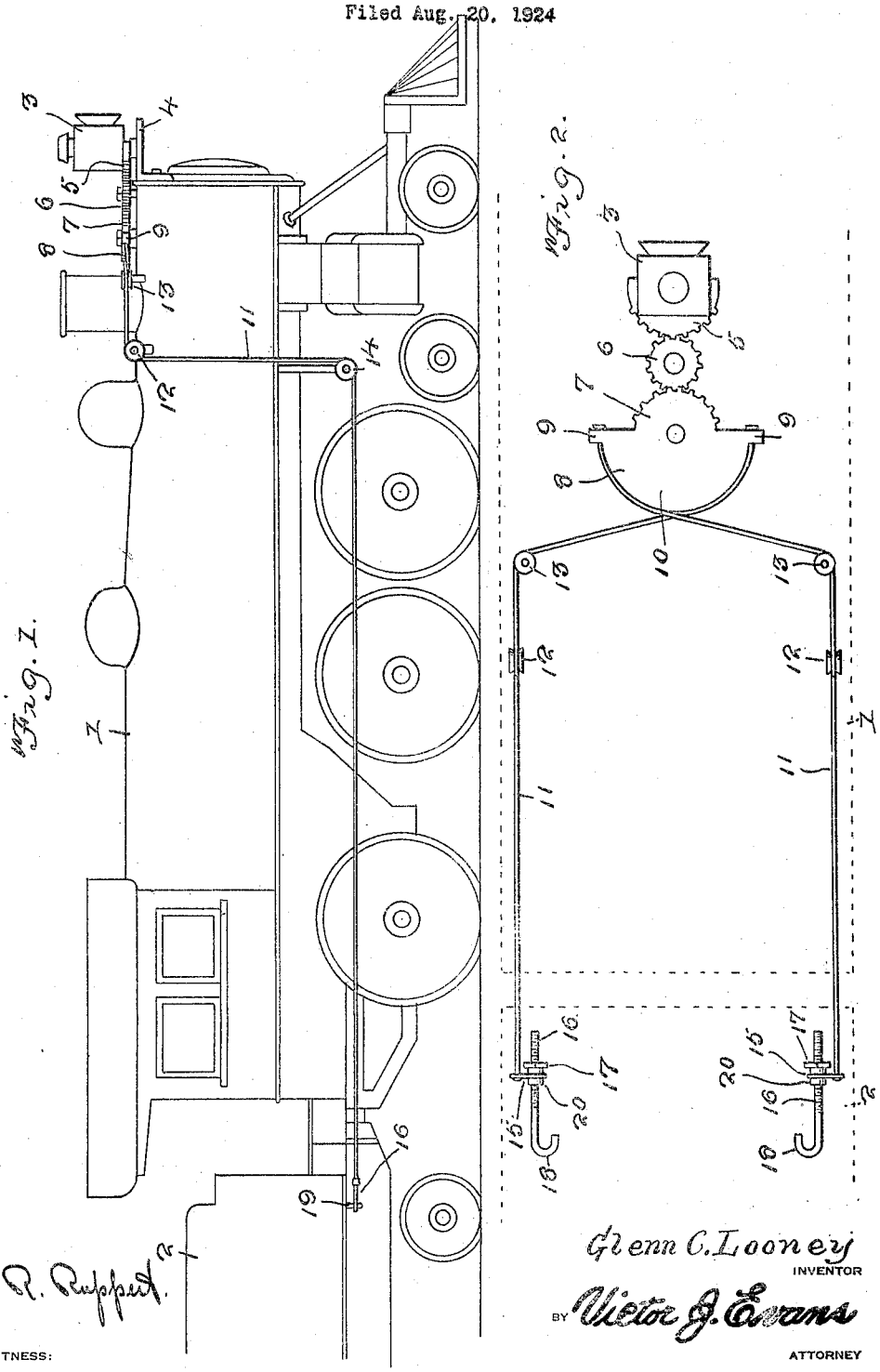

Patented Sept. 29, 1925.

1,555,681

UNITED STATES PATENT OFFICE.

GLENN C. LOONEY, OF MAXIE, VIRGINIA, ASSIGNOR OF ONE-HALF TO JOHN T. LOONEY AND ONE-HALF TO FRANK E. MORGAN, BOTH OF GRUNDY, VIRGINIA.

LOCOMOTIVE-HEADLIGHT-MOVING MEANS.

Application filed August 20, 1924. Serial No. 733,162.

*To all whom it may concern:*

Be it known that I, GLENN C. LOONEY, a citizen of the United States, residing at Maxie, in the county of Buchanan and State of Virginia, have invented new and useful Improvements in Locomotive-Headlight-Moving Means, of which the following is a specification.

The object of my said invention is the provision of highly efficient means whereby the movement of a locomotive relative to its tender in passing into and through a curve and in passing out of a curve is utilized to move the headlight so that the track ahead of the locomotive will always be adequately illuminated.

To the attainment of the foregoing, the invention consists in the improvement as hereinafter described and definitely claimed.

In the accompanying drawings, forming part of this specification:—

Figure 1 is a side elevation showing a locomotive and its tender equipped with my improvement.

Figure 2 is a view in plan illustrative of the connections intermediate of the tender and the headlight for the movement of the latter.

Similar numerals of reference designate corresponding parts in all of the views of the drawings.

The locomotive 1 and its tender 2 may be and preferably are of the ordinary well known construction, and the headlight 3 in general may be of any construction compatible with the purpose of my invention.

In accordance with my invention the headlight 3 is mounted to turn about its axis on an appropriate support 4 carried at the forward end of the upper portion of the locomotive and fixed to the said headlight 3 is a gear 5. The said gear 5 is meshed with a gear 6 appropriately mounted on the locomotive and meshed, in turn, with the gear 6 is a gear sector 7 suitably mounted on the locomotive at the opposite side of the gear 6 with reference to the gear 5 and formed integral with or fixed to a swinging member 8 characterized by apertured arms 9 and also by a circular portion 10.

Connected to the arms 9 of the member 8 are cables 11 which are passed rearwardly and downwardly over sheaves 12 at opposite sides of the locomotive. It will also be noticed that each cable 11 is passed about the circular portion of the member 10 to the side of the locomotive remote from the arm 9 to which the cable is connected and that before passing over the sheaves 12 which are vertically disposed the said cables are passed about horizontally disposed sheaves 13 at opposite sides of the forward portion of the locomotive. After passing about the sheaves 12 the cables 11 are carried downwardly and about lower vertically disposed sheaves 14 at opposite sides of the locomotive after which the said cables are carried rearwardly and are connected to lateral arms 15 on threaded rods 16, the said rods 16 being disposed longitudinally and being equipped with nuts 17 in front of the arms 15 and being also provided with rear hooks 18. The said hooks 18 are interlocked with eyes 19 or the like carried at the opposite sides of the forward portion of the tender 2. It will also be noticed that in the preferred embodiment of my invention the arms 15 are carried by sleeves 20 which surround and are movable rectilinearly on the rods 16. Manifestly by adjustment of the nuts 17 and movement of the arms 15 on the rod 16 the cables 11 may be rendered taut, and whenever necessary slack in the said cables may be taken up so as to assure prompt movement of the headlight 3 incident to movement of the locomotive 1 relative to the tender 2.

By virtue of my improvement it will be appreciated that when a locomotive enters a curve the movement of the locomotive relative to the tender 2 will bring about turning movement of the headlight 3 so that notwithstanding the curve the track will be properly illuminated ahead of the locomotive, and again it will be appreciated that in moving out of a curve the headlight 3 will be automatically restored to position in line with the locomotive in order to illuminate the portion of track then ahead of the locomotive.

I have specifically described the preferred embodiment of my invention in order to impart an exact understanding of said embodiment. The scope of my invention, however, is defined by my appended claim, and it is to be understood that within the scope of said claim changes or modifications may be made without affecting my invention.

Having described my invention, what I claim and desire to secure by Letters-Patent, is:—

The combination of a locomotive and its tender, a headlight mounted on the forward portion of the locomotive and adapted to be turned about its axis, a gear fixed with respect to the headlight, a body having an arcuate rear portion and also having opposite lateral arms and a forward sector gear between said arms, said body mounted to swing horizontally on the locomotive, a gear interposed between and meshed with the first-named gears, cables connected with the arms of said body and passed in reverse directions over the rear arcuate portion of the body and also passed rearwardly, downwardly and again rearwardly, horizontal guides for said cables, vertical guides for said cables, and means connecting the said cables with opposite sides of the forward portion of the tender.

In testimony whereof I affix my signature.

GLENN C. LOONEY.